United States Patent
Srivastava et al.

(12)

(10) Patent No.: US 6,402,987 B1
(45) Date of Patent: Jun. 11, 2002

(54) YMO₄:EU,L PHOSHPOR WITH IMPROVED LUMEN MAINTENANCE

(75) Inventors: Alok Mani Srivastava; Charles David Greskovich, both of Niskayuna; Steven Jude Duclos, Clifton Park; Holly Ann Comanzo, Niskayuna, all of NY (US); William Winder Beers, Chesterland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/452,648

(22) Filed: Dec. 1, 1999

(51) Int. Cl.⁷ ............................ C09K 11/81; C09K 11/82
(52) U.S. Cl. ........................ 252/301.4 R; 252/301.4 P; 313/485
(58) Field of Search .................. 313/485; 252/301.4 R, 252/301.4 P

(56) References Cited

U.S. PATENT DOCUMENTS

| | | | | |
|---|---|---|---|---|
| 3,322,682 A | * | 5/1967 | Thompson | 252/301.4 R |
| 3,360,675 A | * | 12/1967 | Mikus et al. | 252/301.4 R |
| 3,480,819 A | * | 11/1969 | Faria et al. | 252/301.4 R |
| 3,555,337 A | * | 1/1971 | Faria et al. | 252/301.4 R |
| 5,571,451 A | | 11/1996 | Srivastava et al. | 252/301.4 R |

FOREIGN PATENT DOCUMENTS

| | | | |
|---|---|---|---|
| GB | 1192951 | * | 5/1970 |
| GB | 1289552 | * | 9/1972 |
| JP | 45-41295 | * | 12/1970 |
| JP | 49-27496 | * | 3/1974 |
| JP | 56-99279 | * | 8/1981 |

OTHER PUBLICATIONS

G. Blasse and B. C. Grabmaier, *Luminescent Materials*, pp. 24, 25, 52, 53, 104, 105, 111, 128–130, (1994).
Steven J. Duclos et al., Electronic Trap Defects in Y2O2:Eu and (Y,GD)2O3:Eu X–ray Scintillators, 348 Mat. Res. Symp. Proc. 503–509 (1994).

* cited by examiner

Primary Examiner—C. Melissa Koslow
(74) Attorney, Agent, or Firm—Toan P. Vo; Noreen C. Johnson

(57) ABSTRACT

A $Y(P,V)O_4:Eu^{3+}$ red emitting phosphor is doped with at least one of a trivalent rare earth ion excluding Eu and a divalent metal ion to improve the lumen maintenance of the phosphor. The preferred material is the $Y(P,V)O_4:Eu^{3+}$ phosphor doped with trivalent $Tb^{3+}$ ions and divalent $Mg^{2+}$ ions.

41 Claims, 4 Drawing Sheets

1

YMO₄:EU,L PHOSHPOR WITH IMPROVED LUMEN MAINTENANCE

FIELD OF THE INVENTION

The present invention is directed to a luminescent material doped with trivalent and/or divalent ions, and more particularly to a $YMO_4$:Eu,L material doped with $Tb^{3+}$ and/or $Mg^{2+}$ and used as a lamp phosphor.

BACKGROUND OF THE INVENTION

A luminescent material absorbs energy in one portion of the electromagnetic spectrum and emits energy in another portion of the electromagnetic spectrum. A luminescent material in powder form is commonly called a phosphor, while a luminescent material in the form of a transparent solid body is commonly called a scintillator.

Most useful phosphors emit radiation in the visible portion of the spectrum in response to absorption of radiation which is outside the visible portion of the spectrum. Thus, the phosphor performs the function of converting electromagnetic radiation to which the human eye is not sensitive into electromagnetic radiation to which the human eye is sensitive. Most phosphors are responsive to more energetic portions of the electromagnetic spectrum than the visible portion of the spectrum. Thus, there are powder phosphors which are responsive to ultraviolet light (as in fluorescent lamps), electrons (as in cathode ray tubes) and x-rays (as in radiography).

Two broad classes of luminescent materials are recognized. These are self-activated luminescent materials and impurity-activated luminescent materials.

A self-activated luminescent material is one in which the pure crystalline host material, upon absorption of a high energy photon, elevates electrons to an excited state from which they return to a lower energy state by emitting a photon. Self-activated luminescent materials normally have a broad spectrum emission pattern because of the relatively wide range of energies which the electron may have in either the excited or the lower energy states. Thus, any given excited electron may emit a fairly wide range of energy during its transition from its excited to its lower energy state, depending on the particular energies it has before and after its emissive transition.

An impurity activated luminescent material is normally one in which a non-luminescent host material has been modified by inclusion of an activator species which is present in the host material in a relatively low concentration, such as in the range from about 200 parts per million to 1,000 parts per million. However, some phosphors require several mole or atomic percent of activator ions for optimized light output. With an impurity activated luminescent material, the activator ions may directly absorb the incident photons or the lattice may absorb the incident photons and transfer the absorbed photon energy to the activator ions.

The photon absorbed by the lattice may create mobile migrating electrons and holes in the lattice. Due to favorable charge configurations, the migrating electrons and holes are trapped at the activator ions, where they recombine and emit a photon of luminescent light.

Alternatively, if the photon is absorbed directly by the activator ion, the photon raises one or more electrons of the activator ions to a more excited state. These electrons, in returning to their less excited state, emit a photon of luminescent light.

In many commonly employed impurity activated luminescent materials, the electrons which emit the luminescent light are d or f shell electrons whose energy levels may be significantly affected or relatively unaffected, respectively, by the surrounding crystal field. In those situations where the activator ion is not significantly affected by the local crystal field, the emitted luminescent light is substantially characteristic of the activator ions rather than the host material and the luminescent spectrum comprises one or more relatively narrow emission peaks. This contrasts with a self-activated luminescent material's much broader emission spectrum.

When a host lattice absorbs the incident photon (i.e. the excitation energy) and transfers it to the activator ion, the host lattice acts as a sensitizer. The host lattice may also be doped with a sensitizer atoms. The sensitizer atoms absorb the incident photon either directly, or from the host lattice, and transfer it to the activator ion. For example, in a $YVO_4$:$Eu^{3+}$ phosphor, incident ultraviolet radiation excites the vanadate group ($VO_4^{3-}$) of the host $YVO_4$ lattice, which transfers the excitation energy to the $Eu^{3+}$ activator ions present on the Y cationic sites in the lattice. The emission spectra of $Eu^{3+}$ activator ions in the $YVO_4$:$Eu^{3+}$, phosphor comprises sharp lines in the red spectral range. These lines correspond to transitions from the excited $^5D_0$ level to the $^7F_2$ levels of the $4f^6$ configuration.

The $YVO_4$:$Eu^{3+}$, phosphor is commonly used in a high pressure mercury vapor lamp (HPMV). This lamp typically has a relatively low emission in the red spectral region. When the HPMV lamp is used in outdoor applications, red objects appear dull brown. This leads to practical disadvantages. For example, it becomes hard to distinguish red objects from brown objects in an area lighted by the HPMV lamp.

Therefore, the inside surface of the HPMV lamp bulb is coated with the $YVO_4$:$Eu^{3+}$ phosphor to correct for the lamp's lack of emission in the red spectral range. It is thought that the phosphor absorbs the long and short UV radiation from the lamp and emits radiation in the red spectral range (i.e. visible light). Since HPMV lamps reach operating temperatures of 200–2500° C. and have an operating rated life of about 24,000 hours, it is important that the color correcting phosphor be resistant to radiation damage and exhibit a high lumen maintenance. Radiation damage is the characteristic of a luminescent material in which the quantity of light emitted by the luminescent material in response to a given intensity of stimulating radiation decreases after the material has been exposed to a high radiation dose. Lumen maintenance is the ability of a luminescent material to resist radiation damage over time. Luminescent materials with a high resistance to radiation damage over time have a high lumen maintenance.

However, the $YVO_4$:$Eu^{3+}$ phosphor may exhibit an appreciable decrease in light output after several hundred hours of operation of the HPMV lamp at temperatures between 200–250° C. Therefore, the $YVO_4$:$Eu^{3+}$ phosphor may have a lumen maintenance which is undesirably low in some cases.

In view of the foregoing, it would be desirable to provide a red emitting phosphor material that exhibits an adequate lumen maintenance. It would also be desirable to provide a method of making such a phosphor.

SUMMARY OF THE INVENTION

The present invention provides a composition of matter, comprising $YMO_4$:Eu,L where M comprises at least one of vanadium and phosphorus and L comprises at least one of a trivalent rare earth ion excluding Eu and a divalent metal ion.

The present invention also provides a lamp, comprising a bulb having inside and outside surfaces, a gas discharge envelope, a base, at least two gas discharge electrodes and a phosphor on at least one of the surfaces of the bulb, wherein the phosphor comprises $YMO_4$:Eu,L where M comprises at least one of vanadium and phosphorus and L comprises at least one of a trivalent rare earth ion excluding Eu and a divalent metal ion.

Furthermore, the present invention provides a method of making a composition of matter by mixing carbonate, oxide, oxalate or nitrate compounds of yttrium, vanadium, europium and at least one of a trivalent rare earth element excluding europium and a divalent metal element and heating a resulting mixture.

DETAILED DESCRIPTION OF THE INVENTION

Figure 1:
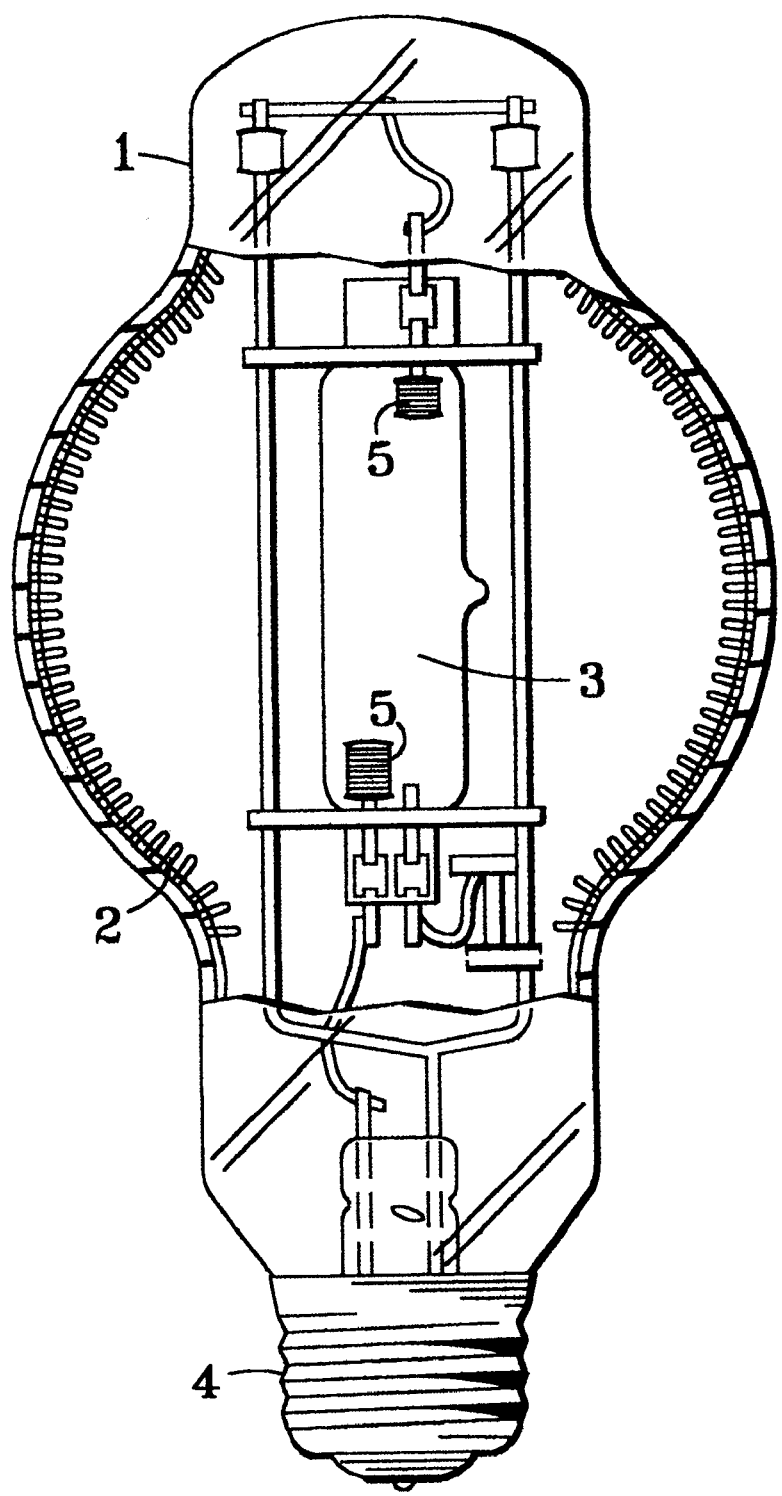
FIG. 1 is side cross sectional view of a HPMV lamp coated with a phosphor in accordance with an exemplary embodiment of the present invention.

The present inventors have discovered that doping the $YVO_4$:$Eu^{3+}$ phosphor with trivalent rare earth ions and/or divalent metal ions improves the phosphor's lumen maintenance. The present inventors believe that the decrease in lumen maintenance of the HPMV lamp containing the $YVO_4$:$Eu^{3+}$ phosphor is actually caused by two separate factors. The trivalent and divalent ions counterbalance the effects of these factors.

The first factor contributing to a decrease in lumen maintenance is the formation of color centers due to the absorption by the phosphor of 185 nm UV lamp emission at a high operating temperature. A color center is a lattice defect that traps electrons and/or holes, which leads to emission of radiation from the lattice defect at an undesired wavelength or color. In a $YVO_4$:$Eu^{3+}$ phosphor, incident radiation is absorbed by the lattice to create migrating electrons and holes. In an ideal or perfect lattice, these electrons and holes are both trapped by the $Eu^{3+}$ activator and then recombine to emit a photon. However, the current inventors believe that the emitted lamp UV radiation and/or the high lamp operating temperature causes lattice diffusion in the phosphor that leads to a creation of charged lattice defects, such as negatively charged cation vacancies, over time. These lattice defects preferentially trap migrating holes generated in the lattice by the exciting radiation (i.e. by the lamp 185 nm UV emission). Therefore, an insufficient number of holes is trapped by the activator ions. With holes being trapped at the lattice defects, the electrons trapped at $Eu^{3+}$ activator ions ($Eu^{3+}$ is a primary electron trap) lack a sufficient number of holes necessary for radiative recombination. Hence, the lattice defects contribute to a decrease in lumen maintenance.

The second factor contributing to a decrease in lumen maintenance of $YVO_4$:$Eu^{3+}$ is believed to be the change in the valence state or oxidation state of the vanadium ion. As used herein, the terms valence state and oxidation state have the same meaning.

The vanadate ($VO^{3-}_4$) ion has a 3- valence state due to a 5+ vanadium ion valence state and an oxygen ion with a 2- valence state (+5+4*(-2)=-3). However, it is believed that the 185 nm UV radiation emitted by the HPMV lamp photoionizes the V ions in $YVO_4$:$Eu^{3+}$ phosphor and causes the vanadium ions to drift from the 5+ valence state to a lower valence state.

The $YVO_4$:$Eu^{3+}$ phosphor absorbs the greater part of the incident UV radiation in the vanadate $VO_4^{3-}$ group. The excitation energy migrates from the vanadate group to the $Eu^{3+}$ ion activator. However, if the vanadate oxidation state changes, then the transfer is hampered. This in turn causes a negative effect on lumen maintenance of the phosphor.

According to a first preferred embodiment of the present invention, the present inventors have discovered that the lumen maintenance decreasing effects of the hole trapping lattice defects (i.e. the first factor) may be reduced by doping the $YVO_4$:$Eu^{3+}$ phosphor with at least one trivalent rare earth ion species. When trivalent rare earth elements are added to the phosphor lattice, they assume a 3+ valence state. Hence, they are referred to as "trivalent ions."

The preferred trivalent ions are $Ce^{3+}$, $Pr^{3+}$ and $Tb^{3+}$. The most preferred ion is $Tb^{3+}$. While the present inventors do not wish to be bound by any particular theory as to why trivalent rare earth ions improve the phosphor lumen maintenance, the present inventors believe the following.

The trivalent rare earth ions improve the $YVO_4$:$Eu^{3+}$ lumen maintenance by counteracting the negative effects of the lattice defects responsible for the color centers by preferentially trapping the holes created during UV excitation of the phosphor to form a tetravalent ion ($Tb^{4+}$ $Ce^{4+}$, Pr 4+). For example, the $Ce^{3+}$ ion has one more valence electron than a completely filled shell. The extra electron is available for recombination with a trapped hole to place the Ce ion into an energetically favorable 4+ valence state, signifying an empty valence shell(s) and completely filled non valence shells. The Tb and Pr ions also contain electronic configurations which promote the formation of energetically favorable 4+ valence states.

The trivalent rare earth ions have a larger hole trapping cross section than the lattice defects, such as vacancies. Therefore, the free holes are preferentially trapped at the trivalent rare earth ion hole traps rather than at the lattice defect hole traps. Therefore, it appears that the trivalent metal ions contribute to an improvement in lumen maintenance of the $YVO_4$:$Eu^{3+}$ phosphor by counteracting the effect of lattice defect hole traps.

The addition of trivalent rare earth ions also results in an improvement in lumen maintenance of phosphors other than $YVO_4$:$Eu^{3+}$. For example, the phosphor of the present invention may be modified by substituting all or a part of the vanadium with phosphorus which has the same +5 valence state. This phosphor may be equivalently written as $Y(P,V)O_4$:$Eu^{3+}$ or $Y(P_aV_{1-a})O_4$:$Eu^{3+}$ where "a" ranges from 0 to 1.

The Eu activator is written after a colon to signify that it is a dopant rather than an element whose concentration is equal to that of Y, P or V. The Eu dopant ions occupy the Y cationic sites in the host lattice. Therefore, the phosphor of the present invention may also be expressed in the following notation: $(Y,Eu)(P,V)O_4$. This notation signifies that Eu dopant ions may be substituted for Y ions on first cationic lattice sites and that P ions may be found on some or all V lattice sites.

The Eu activator concentration is preferably 0–5 atomic percent of the total cationic species. To include the Eu concentration in the formula, the phosphor formula may be written as $(Y_{1-b}Eu_b)$ $(P_aV_{1-a})O_4$ or $(Y_{1-b}Eu_b)(P,V)O_4$ where $0 \leq a \leq 1$ and $0 < b \leq 0.05$.

The preferred concentration of the trivalent rare earth dopant is between 0–2 atomic percent (i.e. mole percent) of the total cationic species, most preferred 0.5 to 1.5 atomic percent. A higher concentration is also effective at improving the lumen maintenance of the phosphor, but may adversely effect the red $Eu^{3+}$ emission intensity.

When the phosphor according to exemplary embodiments of the present invention is doped with a trivalent rare earth ion, T, then it may be written as $Y(P,V)O_4:Eu^{3+}:T^{3+}$ or $Y(P_aV_{1-a})O_4:Eu^{3+}:T^{3+}$. Furthermore, because the majority of the trivalent rare earth ions occupy the Y cationic lattice sites, the phosphor formula may be written as $(Y,T)(P,V)O_4:Eu^{3+}$ or $(Y,Eu,T)(P,V)O_4$ or $(Y_{1-b-d}Eu_bT_d)(P_aV_{1-a})O^4$. If the preferred T concentration of between 0 and 2 atomic percent is included in the formula, then the phosphor may be written as $(Y_{1-d}T_d)(P,V)O_4:Eu$ or $(Y_{1-b-d}Eu_bT_d)(P_aV_{1-a})O_4$ where $0 \leq b \leq 0.05$ and $0 < d \leq 0.02$.

However, preferred shorthand formulas of the phosphor of the present invention are $YMO_4:Eu,T$ or $(Y_{1-d}T_d)MO_4:Eu$, where M is at least one of P and V, $0 < d \leq 0.02$ and the Eu ion has a 3+ valence state. It should be understood, that the phosphor may be expressed in several different notations, to indicate that the phosphor preferably contains yttrium, oxygen, europium, at least one of phosphorus and vanadium and at least one trivalent rare earth element. The preferred trivalent rare earth elements are terbium, cerium and praseodymium. The phosphor of the present invention may be doped with any combination of one or more of these trivalent rare earth elements. The phosphor of the present invention may be doped with any combination of one or more of these trivalent rare earth elements.

The preferred specific phosphor materials are:
1) $(Y_{1-d}Tb_d)VO_4:Eu$
2) $(Y_{1-d}Tb_d)PO_4:Eu$ and
3) $(Y_{1-d}Tb_d)(P,V)O_4:Eu$
wherein $0 < d \leq 0.02$ and Eu has a 3+ valence state. As noted above, these materials may be written in different notation, with Eu being written inside the first parenthesis, with the 3+ valence state being written after "Eu", or with a comma between the P and V being replaced with subscripts.

According to a second embodiment of the present invention, the inventors have discovered that the lumen maintenance decreasing effects of the change in the vanadate $(VO_4^{3-})$ ion valence state (i.e. the second factor) may be reduced by doping the $YVO_4:Eu^{3+}$ phosphor with at least one divalent metal ion species. The preferred divalent metal ions are magnesium, calcium, strontium, barium and zinc. The most preferred ion is $Mg^{2+}$. While the present inventors do not wish to be bound by any particular theory as to why divalent metal ions improve the lumen maintenance, the present inventors believe the following.

The divalent metal ions improve the $YVO_4:Eu^{3+}$ lumen maintenance by creating a lattice defect. The charge configuration of the lattice defect stabilizes the vanadium valence state at 5+. Therefore, by decreasing or preventing a variation in the vanadium valance state, the beneficial lattice defect diminishes or even prevents a lumen maintenance decrease in the phosphor.

The phosphor with a stable vanadate ion valence state has an improved lumen maintenance because a reduced fluctuation in vanadate ion valence state leads to a reduced interference with excitation energy transfer from the vanadate sensitizer ions to the Eu activator ions.

The phosphor according to the second embodiment of the present invention is preferably written as $YMO_4:Eu,D$ or $(Y,D)MO_4:Eu$, where M comprises at least one of P and V and D comprises at least one divalent metal ion species. The majority of divalent metal ions probably occupy the Y cationic lattice sites. The preferred divalent metal ions comprise Mg, Ca, Sr, Ba and Zn. Of course, any combination of the divalent metal ion species may be used instead of a single type of divalent metal ion. The divalent metal ion, D, preferably comprises greater than zero and less than or equal to 5 atomic percent of the total cation species, most preferably 2–3 atomic percent. If the preferred D concentration is included in the notation, then the phosphor formula may be written as $(Y_{1-x}D_x)MO_4:Eu$, where $0 \leq x \leq 0.05$, M comprises at least one of P and V, and D comprises at least one divalent metal ion species. The Eu activator has a 3+ valence state. The phosphor may be written in other equivalent notations, as discussed with respect to the first embodiment.

The preferred specific phosphor materials are:
1) $(Y_{1-x}Mg_x)VO_4:Eu$
2) $(Y_{1-x}Mg_x)PO_4:Eu$ and
3) $(Y_{1-x}Mg_x)(P,V)O_4:Eu$
wherein $0 < x \leq 0.05$ and Eu has a 3+ valence state.

According to a third embodiment of the present invention, the $Y(P,V)O_4:Eu^{3+}$ phosphor is doped with both a trivalent rare earth ion of the first embodiment and a divalent metal ion of the second embodiment. As noted with respect to the first and second embodiments, the current inventors believe that trivalent and divalent dopant ions reduce the adverse lumen maintenance effects of two different mechanisms. Therefore, trivalent and divalent ions cumulatively contribute to the lumen maintenance improvement of the phosphor.

The phosphor according to the third embodiment of the present invention is preferably written as $YMO_4:Eu,T,D$ or $(Y,D,T)MO_4:Eu$, where M comprises at least one of P and V, T comprises at least one trivalent metal ion excluding Eu, and D comprises at least one divalent ion. The preferred trivalent rare earth metal ions comprise Tb, Ce and Pr. The preferred divalent metal ions comprise Mg, Ca, Sr, Ba and Zn. If the preferred T and D concentrations are included in the notation, then the phosphor may be written as $(Y_{1-x-z}D_xT_z)MO_4:Eu$, wherein $0 < x \leq 0.05$, $0 < z \leq 0.02$, M comprises at least one of P and V, T comprises at least one trivalent rare earth ion excluding Eu, and D comprises at least one divalent metal ion. The Eu activator has a 3+ valence state. The phosphor may be written in other equivalent notations, as discussed with respect to the first embodiment.

The preferred specific phosphor materials are:
1) $(y_{1-x-d}Mg_xTb_d)VO_4:Eu$
2) $(Y_{1-x-d}Mg_xTb_d)PO_4:Eu$ and
3) $(Y_{1-x-d}Mg_xTb_d)(P,V)O_4:Eu$
wherein $0 < x \leq 0.05$, $0 < d \leq 0.02$ and Eu has a 3+ valence state.

Finally, the phosphor material according to any embodiment of the present invention may be written generically as
1) $YMO_4:Eu,L$ where M comprises at least one of vanadium and phosphorus and L comprises at least one of a trivalent rare earth ion excluding Eu and a divalent metal ion, or as
2) $(Y_{1-x-d}D_xT_d)MO_4:Eu$, wherein $0 \leq x \leq 0.05$, $0 \leq d \leq 0.02$, M comprises at least one of vanadium and phosphorus, D comprises at least one divalent metal ion and T comprises at least one trivalent rare earth ion excluding Eu.

The $YMO_4:Eu,L$ phosphor may be used in several applications. The phosphor may be used to coat a display screen, such as a television, a liquid crystal display or a plasma display screen. Preferably, the phosphor is used on a bulb of a lamp, such as a fluorescent lamp.

The use of the inventive phosphor discussed herein in a high pressure mercury vapor (HPMV) lamp is also considered inventive. An exemplary HPMV lamp is shown in FIG. 1. The HPMV lamp includes a glass bulb 1, the $YMO_4$:Eu,L phosphor 2 coated on the inner surface of the bulb 1, a gas discharge envelope 3, a lamp cap or base 4, and gas discharge electrodes 5. Alternatively, the phosphor 2 may be coated on the outside surface of the bulb, on the gas discharge envelope, or on some other surface. The bulb 1 is preferably made of glass and the gas discharge envelope is preferably made of quartz. Other transparent materials may also be used. The gas discharge envelope 3 is filled with a gas, such as high pressure mercury. The gas emits radiation (i.e. light) when a potential is applied to the electrodes 5 through the base 4.

The phosphors according to the preferred embodiments of the present invention were characterized by transient thermoluminescence ("TTL") to demonstrate the effect of adding the trivalent rare earth ions and divalent metal ions to the phosphors. TTL (also known as "temperature dependence of afterglow") is a measurement technique for determining the existence of hole trap states. TTL is the measurement of the emitted light at different temperatures after the visible or UV excitation has been turned off. TTL measurement techniques are generally known in the art and are described, for example, in Steven J. Duclos, et al. *Electronic Trap Defects in $Y_2O_3$:Eu and $(Y,Gd)_2O_3$:Eu X-Ray Scintillators*, Materials Research Society Symposium Proceedings, volume 348, pages 503–509 (1994), incorporated herein by reference. In the TTL spectra shown in FIGS. 2–4, the five curves represent different measurement times t after cessation of the incident excitation radiation (i.e., UV or visible light). The open circles correspond to t=0.05 sec., the squares correspond to t=0.1 sec., the rhombuses correspond to t=0.2 sec., the triangles correspond to t=0.5 sec., and the upside down triangles correspond to t=0.98 sec. The five TTL curves represent the afterglow emission as a percentage of steady state emission.

Figure 2:
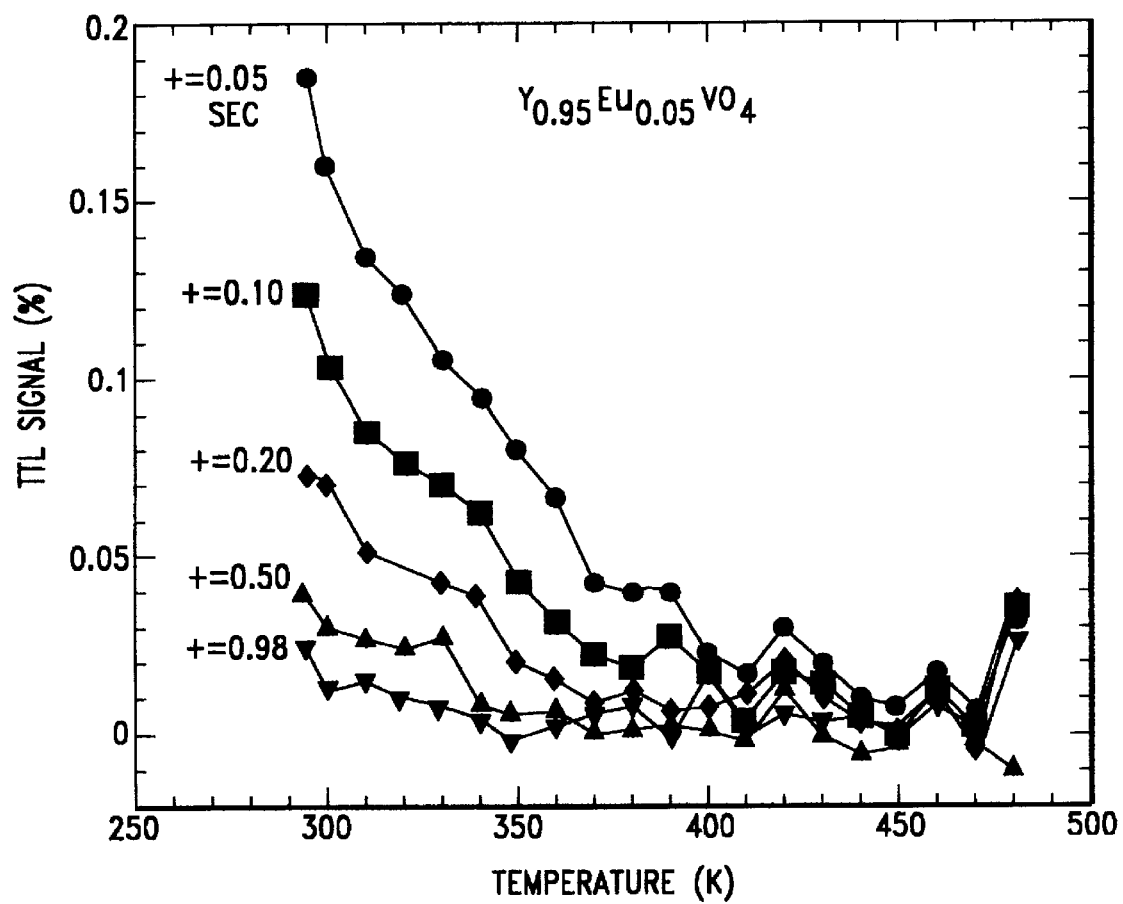
FIG. 2 is a TTL spectra of a prior art $YVO_4$:$Eu^{3+}$ phosphor.

FIG. 2 shows a TTL spectra of a $YVO_4$:$Eu^{3+}$ phosphor ($Y_{0.95}Eu_{0.05}VO_4$) that was not doped with either $Mg^{2+}$ or $Tb^{3+}$. The TTL curves have a broad peak at a temperature below 350 K indicative of a presence of a lattice defect color centers that trap migrating holes.

Figure 3:
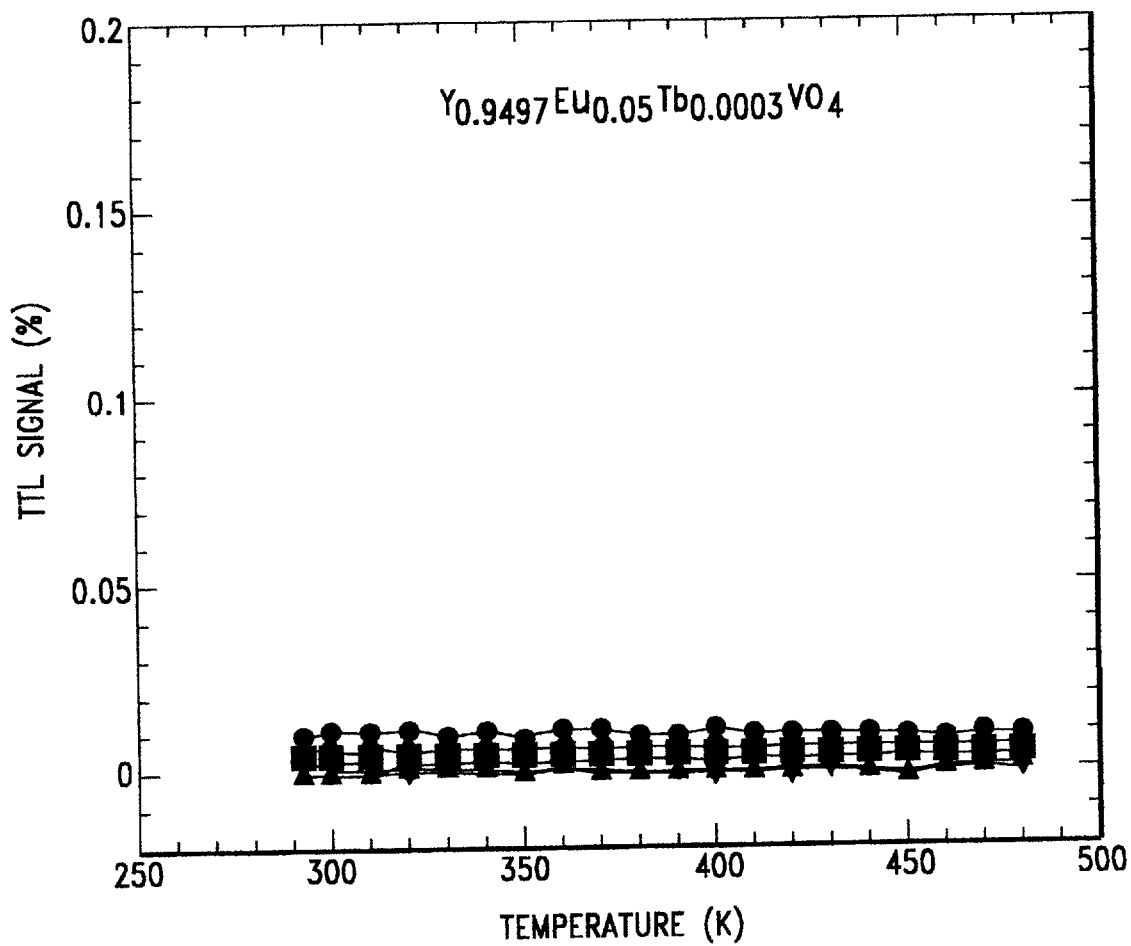
FIG. 3 is a TTL spectra of $Tb^{3+}$ doped $YVO_4$:$Eu^{3+}$ phosphor in accordance with an exemplary embodiment of the present invention.

To demonstrate the effect of the addition of a trivalent rare earth ion on improvement in lumen maintenance, a (Y,Tb) $VO_4$:$Eu^{3+}$ phosphor ($Y_{0.9497}Eu_{0.05}Tb_{0.0003}VO_4$) was characterized by TTL, as shown in FIG. 3. The TTL curves lack the broad peak corresponding to the lattice defect color center. Therefore, trivalent ion doping of the $YVO_4Eu^{3+}$ phosphor counteracts the detrimental effects of the lattice defect color centers on the phosphor lumen maintenance.

Figure 4:
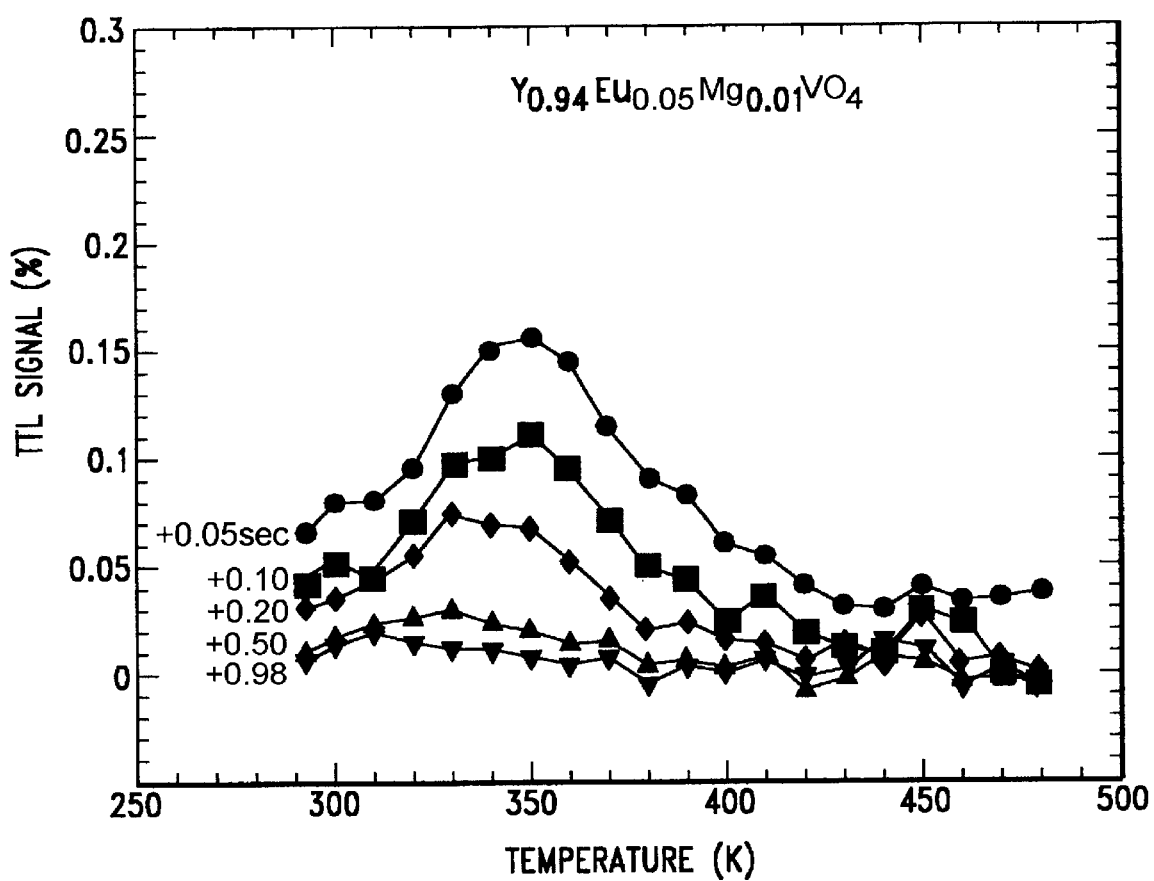
FIG. 4 is a TTL spectra of $Mg^{2+}$ doped $YVO_4$:$Eu^{3+}$ phosphor in accordance with an exemplary embodiment of the present invention.

To demonstrate the effect of the addition of a divalent metal ion on improvement in lumen maintenance, a (Y,Mg) $VO_4$:$Eu^{3+}$ phosphor ($Y_{0.94}Eu_{0.05}Mg_{0.01}VO_4$) was characterized by TTL, as shown in FIG. 4. The TTL curves of the Mg doped phosphor shown in FIG. 4 exhibit a distinct peak centered at about 350 K that is not present in the TTL curves of the Mg free $YVO_4$:$Eu^{3+}$ phosphor shown in FIG. 2. It is believed that the new peak corresponds to the Mg induced lattice defect responsible for stabilizing the vanadate ion valence state. Therefore, divalent ion doping of the $YVO_4Eu^{3+}$ phosphor counteracts the effects of the vanadate ion valence state instability on the phosphor lumen maintenance.

The improved lumen output from $Tb^{3+}$ and $Tb^{3+}$, $Mg^{2+}$ doped $YVO_4$:$Eu^{3+}$ phosphors coated on a linear fluorescent lamp is compared to the lumen output from $YVO_4$:$Eu^{3+}$ phosphor coated on a linear fluorescent lamp in the table below.

TABLE

| COMPOSITION | Initial Lumen Output | Lumen output after 100 hrs of operation | Decrease in lumen output after 100 hrs |
|---|---|---|---|
| $YVO_4$:$Eu^{3+}$ | 1720 | 1294 | −426 (25%) |
| $(Y,Tb)VO_4$:$Eu^{3+}$ | 1716 | 1494 | −223 (13%) |
| $(Y,Mg,Tb)VO_4$:$Eu^{3+}$ | 1790 | 1615 | −175 (10%) |

As shown in the table, the lamp coated with a $YVO_4$:$Eu^{3+}$ suffered a 25% decrease in lumen output after 100 hours of operation. However, the lamps coated with a (Y,Tb) $VO_4$:$Eu^{3+}$ and $(Y,Mg,Tb)VO_4$:$Eu^{3+}$ suffered only a 13% and 10% decrease in lumen output, respectively, after 100 hours of operation. Therefore, the addition of Tb and Mg ions improved the lumen maintenance of the lamp phosphor. The phosphor doped with Tb and with Tb and Mg ions maintained 87% and 90%, respectively, of the original lumen output. The results are expected to be the same for an HPMV lamp.

The $YMO_4$:Eu,L phosphor may be made by liquid phase or solid state reaction methods. The phosphor made by the liquid phase or solid state method is then coated onto the substrate, such as a screen or a lamp bulb. Preferably, a suspension of the phosphor particles and a liquid is used to coat the substrate.

Alternatively, a mixture comprising starting compounds; such as carbonate, oxide, oxalate, and/or nitrate; of the metal constituents of the desired phosphor are mixed together in a liquid or solid state. The mixture may further contain a fluxing compound or an inert solvent. The starting compounds of the mixture may undergo a liquid or solid phase reaction. The mixture is then deposited on a substrate, and the deposited substrate is heated to a temperature in a range from about 800–1300° C. in air to convert the mixture into the desired phosphor and to form a substrate coated with such desired phosphor.

The preferred liquid phase method is a flux method, where the starting components, such as oxides of the metal constituents, are reacted in a $Na_2B_4O_7 \cdot 10\, H_2O$ melt to form the phosphor compound.

The preferred solid state method of making the phosphor compound comprises the following steps. First, compounds used to make the phosphor material are mixed in a ball mill with a liquid vehicle, such as 60 ml of isopropanol (isopropyl alcohol) for a 10 gram batch. The preferred compounds comprise oxides or carbonates of the metal constituents. Oxalates or nitrates of the metal constituents may also be used. For example, to form $(Y,Tb,Mg)VO_4$:Eu, yttrium oxide ($Y_2O_3$), terbium oxide ($Tb_4O_7$), magnesium carbonate ($MgCO_3$), vanadium pentoxide ($V_2O_5$) and europium oxide ($Eu_2O_3$) may be used as starting materials. Alternatively, $NH_4Y[C_2O_4]_2 \cdot H_2O$ may be used as the source of $Y_2O_3$, Eu nitrate may be used as the source of $Eu_2O_3$, $NH_4VO_3$ may be used as the source for $V_2O_5$ and terbium nitrate and magnesium nitrate may be used as the Tb and Mg dopant source. If it is desired to add phosphorus to the phosphor material, then diammonium phosphate may be added to the mixture.

The starting materials are preferably wet milled for two hours in a plastic jar mill along with about 60 ml of isopropyl alcohol and 25 grams of yttrium toughened zirconia (YTZ) milling media. The milling may be carried at any temperature below the firing temperature (e.g. at or above room temperature). The mixed powders are then poured into a drying dish and dried. The dried powder mixture is then placed in a high purity alumina crucible and heated (fired) at 800–1300° C., preferably 850° C., in air for 3 hours to form the phosphor powder.

SPECIFIC EXAMPLE

It should be understood that the example below is meant to merely illustrate the present invention and should not be deemed as limiting the scope of the claims.

A $Y_{0.949}Tb_{0.001}Eu_{0.05}VO_4$ phosphor was made by the liquid phase flux method. The following amounts of each starting ingredients were used to prepare a 10 gram batch:
5.174 g of $Y_2O_3$
0.425 g of $Eu_2O_3$
0.009 g of $Tb_4O_7$
4.392 g of $V_2O_5$ The weight of each ingredient was determined by converting the desired mole percent to weight percent. The weighed oxides were placed in 125 ml size plastic jar along with 5 grams of the sodium borate powder, to be used as a flux at the synthesis temperature, and about 25 grams of yttrium toughened zirconia (YTZ) balls for efficient milling and mixing. The ingredients were ball milled in the closed jar for 2 hours, poured into a high purity alumina crucible after removal of the YTZ balls, and reacted for 6 hours at 850° C. in air. During the heat treatment, the oxide reactants dissolved in the sodium borate melt and reacted to form the doped yttrium vanadate phosphor powder. Because of a small loss of $V_2O_5$ due to evaporation during the reaction step, an excess of 2 mole % or 0.18 extra grams of $V_2O_5$ was added to the mixture. The reacted mass was a mixture of the phosphor powder and a solidified flux. The sodium borate flux was separated from the phosphor powder by dissolution in hot distilled water, which was carried out until the wash water reached a pH value of 6.

The phosphor powder was characterized by spectroscopy and particle size analyses. The particle size distribution of the phosphor showed an average particle size of 4.8 microns with all of particles being smaller than 10 microns. Inductive coupled plasma atomic emission spectroscopy and flame atomic absorption spectroscopy chemical analyses were used to determine the actual amount of each selected dopant incorporated into the synthesized vanadate phosphor powder. The concentration of rare earth dopants present in the phosphor composition was generally at least 95% of the desired $YO_{0.949}Tb_{0.001}Eu_{0.05}VO_4$ concentration.

It should be noted that the concentrations of the divalent metal ion dopants in the phosphor made by the flux method may be less than the desired or expected concentrations. For example, when the phosphor contains Mg or Ca, these dopants were found to be only about 65% and 20%, respectively, of their desired concentration because a portion of MgO and CaO remain in the flux melt. Therefore, the amount of starting divalent ion dopant materials may have to be increased in order to obtain the desired dopant concentration in the phosphor.

While the invention has been described in detail and with reference to specific embodiments thereof, it will be apparent to one skilled in the art that various changes and modifications can be made therein without departing from the spirit and scope of the invention.

What is claimed is:

1. A composition of matter comprising:
   $Y(P_{1-a}V_a)O_4$:Eu,L
   wherein $0 \leq a < 1$; and L comprises at least one ion selected from the group consisting of trivalent rare earth ions excluding Eu and divalent metal ions.

2. The composition of claim 1, wherein Eu is in a 3+ valence state.

3. The composition of claim 1, wherein a portion of yttrium ions is substituted with ions of at least one of magnesium, calcium, strontium, barium, and zinc.

4. The composition of claim 1, wherein a portion of yttrium ions is substituted with ions of at least one of terbium, cerium and praseodymium.

5. The composition of claim 1 comprising:
   $(Y_{1-d}Tb_d)VO_4$:Eu;
   wherein $0.1 < d < 1$.

6. The composition of claim 1 comprising:
   $(Y_{1-x-d}Mg_xTb_d)VO_4$:Eu;
   wherein $0 < x \leq 0.05$ and $0 < d \leq 0.02$.

7. The composition of claim 1 comprising:
   $(Y_{1-x}Mg_x)PO_4$:Eu;
   wherein $0 < x \leq 0.05$.

8. The composition of claim 1 comprising:
   $(Y_{1-d}Tb_d)PO_4$:Eu;
   wherein $0 < d \leq 0.02$.

9. The composition of claim 1 comprising:
   $(Y_{1-x-d}Mg_xTb_d)PO_4$:Eu;
   wherein $0 < x \leq 0.05$ and $0 < d \leq 0.02$.

10. The composition of claim 1 comprising:
    $(Y_{1-x}Mg_x)(P_{1-a}V_a)O_4$:Eu;
    wherein $0 < a < 1$ and $0 < x \leq 0.05$.

11. The composition of claim 1 comprising:
    $(Y_{1-d}Tb_d)(P_{1-a}V_a)O_4$:Eu;
    wherein $0 < a < 1$ and $0 < d \leq 0.02$.

12. The composition of claim 1 comprising:
    $(Y_{1-x-d}Mg_xTb_d)(P_{1-a}V_a)O_4$: Eu;
    wherein $0 < a < 1$, $0 < x \leq 0.05$, and $0 < d \leq 0.02$.

13. The composition of matter of claim 1 comprising a material having a formula:

$$(Y_{1-x-d}D_xT_d)(P_{1-a}V_a)O_4:Eu;$$

wherein $0 \leq a < 1$; $0 \leq x \leq 0.05$; $0 \leq d \leq 0.02$;
D comprises at least one divalent metal ion species; and
T comprises at least one trivalent rare earth ion species excluding Eu; and
wherein D and T are represented by L in claim 1.

14. A composition of matter comprising:
    $(Y_{1-x-d}D_xT_d)MO_4$:Eu;
    wherein D comprises at least one divalent metal ion species; M comprises at least one of vanadium and phosphorus; $0 < x \leq 0.05$; $0 < d \leq 0.02$; and T satisfies a condition selected from the group consisting of:
    (a) T comprising at least one trivalent rare earth ion species other than Eu, Sm, and Dy when M is vanadium; and
    (b) T comprising at least one trivalent rare earth ion species other than Eu when M is other than vanadium.

15. A composition of matter comprising:
    $(Y_{1-x}Mg_x)VO_4$:Eu;
    wherein $0.03 < x \leq 0.05$.

16. A device selected from the group consisting of a lamp and a display comprising a substrate coated with a composition of matter of claim 1.

17. A phosphor comprising a material having a formula selected from the group consisting of:
    $(Y_{1-d}Tb_d)VO_4$:Eu; and
    $(Y_{1-x}Mg_xTb_d)VO_4$:Eu;
    wherein $0 < x \leq 0.05$, $0 < d \leq 0.02$, and the phosphor maintains at least 87% of the original lumen output after 100 hours of operation of a lamp using the phosphor.

18. A lamp comprising:
a bulb having an inside surface and an outside surface;
a gas discharge envelope;
a base;
at least two gas discharge electrodes; and
a phosphor on at least one of the surfaces of the bulb, wherein the phosphor comprises
$Y(P_{1-a}V_a)O_4$:Eu,L
wherein $0 \leq a < 1$; and L comprises at least one ion selected from the group consisting of trivalent rare earth ions excluding Eu and divalent metal ions.

19. The lamp of claim 18, wherein the phosphor is coated onto the interior surface of the bulb.

20. The lamp of claim 18, further comprising mercury vapor within the gas discharge envelope.

21. The lamp of claim 18, wherein Eu is in a 3+ valence state.

22. The lamp of claim 18, wherein the phosphor comprises:
$(Y_{1-x-d}D_xT_d)(P_{1-a}V_a)O_4$:Eu;
wherein $0 \leq a < 1$, $0 \leq x \leq 0.05$, $0 \leq d \leq 0.02$,
D comprises at least one divalent metal ion species, and
T comprises at least one trivalent rare earth ion species excluding Eu; and
wherein D and T are represented by L in the formula of claim 18.

23. The lamp of claim 22, wherein D comprises at least one of magnesium, calcium, strontium, barium and zinc.

24. The lamp of claim 22, wherein T comprises at least one of terbium, cerium and praseodymium.

25. A lamp comprising:
a bulb having an inside surface and an outside surface;
a gas discharge envelope;
a base;
at least two gas discharge electrodes; and
a phosphor on at least one of the surfaces of the bulb, wherein the phosphor comprises:
$(Y_{1-x-d}D_xT_d)(P_{1-a}V_a)O_4$:Eu;
wherein $0 \leq a < 1$, $0 < x \leq 0.05$, $0 < d \leq 0.02$,
D comprises at least one divalent metal ion species, and
T comprises at least one trivalent rare earth ion species excluding Eu.

26. A lamp comprising:
a bulb having an inside surface and an outside surface;
a gas discharge envelope;
a base;
at least two gas discharge electrodes; and
a phosphor on at least one of the surfaces of the bulb, wherein the phosphor comprises
$(Y_{1-x}Mg_x)VO_4$:Eu;
wherein $0.03 < x \leq 0.05$.

27. A lamp comprising:
a bulb having an inside surface and an outside surface;
a gas discharge envelope;
a base;
at least two gas discharge electrodes; and
a phosphor on at least one of the surfaces of the bulb, wherein the phosphor comprises
$(Y_{1-d}Tb_d)VO_4$:Eu;
wherein $0.1 < d < 1$.

28. A lamp comprising:
a bulb having an inside surface and an outside surface;
a gas discharge envelope;
a base;
at least two gas discharge electrodes; and
a phosphor on at least one of the surfaces of the bulb, wherein the phosphor comprises a material selected from the group consisting of:
$(Y_{1-x-d}Mg_xTb_d)VO_4$:Eu;
$(Y_{1-x}Mg_x)PO_4$:Eu;
$(Y_{1-d}Tb_d)PO_4$:Eu;
$(Y_{1-x-d}Mg_xTb_d)PO_4$:Eu;
$(Y_{1-x}Mg_x)(P_{1-a}V_a)O_4$:Eu;
$(Y_{1-d}Tb_d)(P_{1-a}V_a)O_4$:Eu;
$(Y_{1-x-d}Mg_x Tb_d)(P_{1-a}V_a)O_4$:Eu; and mixtures thereof;
wherein $0 < a < 1$, $0 < x \leq 0.05$, and $0 < d \leq 0.02$.

29. A lamp comprising:
a bulb having an inside surface and an outside surface;
a gas discharge envelope;
a base;
at least two gas discharge electrodes; and a phosphor on at least one of the surfaces of the bulb; wherein the phosphor comprises a material having a formula selected from the group consisting of:
$(Y_{1-d}Tb_d)VO^4$:Eu; and
$(Y_{1x}Mg_xTb_d)VO_4$:Eu;
wherein $0 < x \leq 0.05$, $0 < d \leq 0.02$, and
the phosphor maintains at least 87% of the original lumen output after 100 hours of operation of a lamp using the phosphor.

30. A method of making a composition of matter, said method comprising the steps of:
(a) mixing at least one compound of phosphorus and compounds selected from the group consisting of carbonate, oxide, oxalate, nitrate, and mixtures thereof of:
(1) yttrium,
(2) vanadium,
(3) europium, and
(4) at least one element selected from the group consisting of (i) trivalent rare earth elements excluding Eu and (ii) divalent metal elements; and
(b) heating a resulting mixture of said compounds.

31. The method of claim 30, wherein the step of heating comprises heating the resulting mixture at 800 to 1300° C. in air.

32. The method of claim 30, wherein the step of heating produces a phosphor.

33. The method of claim 30, wherein the step of forming a mixture comprises a liquid phase or solid state reaction.

34. The method of claim 30, wherein:
the divalent metal element comprises at least one of magnesium, calcium, strontium, barium and zinc; and
wherein the rare earth element comprises at least one of terbium, cerium and praseodymium.

35. A method for making a device selected from the group consisting of a lamp and a display, said method comprising the steps of:
(a) forming a mixture comprising at least one compound of phosphorus and compounds selected from the group consisting of carbonate, oxide, oxalate, nitrate, and mixtures thereof of:
(1) yttrium;
(2) vanadium;

(3) europium; and
(4) at least one element selected from the group consisting of (i) trivalent rare earth elements excluding Eu and (ii) divalent metal elements;
(b) coating said mixture on a substrate to form a coated substrate;
(c) heating said coated substrate to convert said mixture into a phosphor and to produce said device having said substrate coated with said phosphor.

36. The method of claim 35, wherein the step of forming a mixture comprises forming a suspension of the mixture, and said substrate is selected from the group consisting of said lamp bulb and said display device screen.

37. A composition of matter comprising:

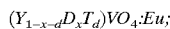

wherein T comprises at least one trivalent rare earth metal ion species other than Eu; D comprises at least one divalent metal ion species other than Be, Cd, and Zn; $0<x\leq 0.08$; $0\leq d\leq 0.02$; and
wherein x and d together satisfy a condition selected from the group consisting of:
(a) $0.03<x\leq 0.05$ and $0\leq d\leq 0.02$ when D is Mg,
(b) $x>0.05$ and $0\leq d\leq 0.02$ when D is selected from the group consisting of Ca, Ba, and Sr, and
(c) $0.005<x\leq 0.05$ and $0<d\leq 0.02$ when D is Mn.

38. A composition of matter comprising:

wherein T comprises at least one trivalent rare earth metal ion species other than Eu; D comprises at least one divalent metal ion species other than Be; $0<d\leq 0.02$; $0<x\leq 0.05$; and
wherein x satisfies a condition selected from the group consisting of:
(a) $0.03<x\leq 0.05$ when D is Mg,
(b) $0.0004<x<0.05$ when D is Zn, and
(c) $x>0.05$ when D is selected from the group consisting of Ca, Ba, and Sr.

39. A composition of matter comprising:

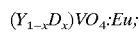

wherein D and x satisfy a condition selected from the group consisting of:
(a) D comprising at least one divalent metal ion species other than Cd and Zn; $0<x\leq 0.05$;
(b) D comprising at least one divalent metal ion species other than Ca and Mn when $0.00001<x<0.005$;
(c) D comprising at least one of Ca and Mn when $0.005<x\leq 0.05$.

40. A composition of matter comprising:

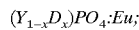

wherein D is a divalent metal ion species, and $0<x\leq 0.05$.

41. A composition of matter comprising

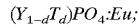

wherein T is a trivalent rare-earth ion species other than $Eu^{3+}$, and $0<d\leq 0.02$.

* * * * *